Sept. 29, 1936.   O. WERNER   2,055,991
VOLTAGE CONTROL OF DRY RECTIFIERS
Filed Sept. 12, 1934
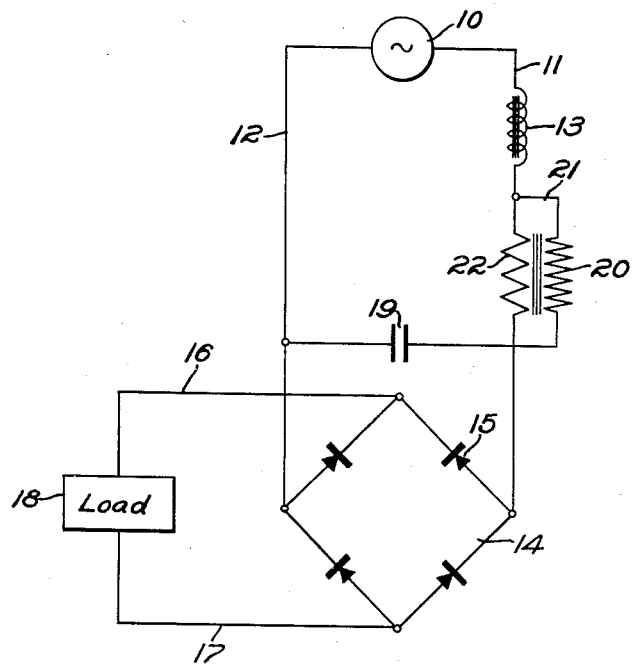
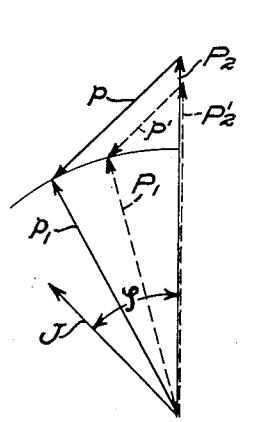
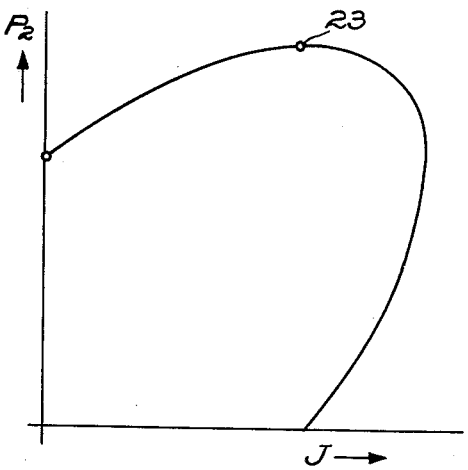
WITNESSES:
P. J. Fitzgerald
R. W. Bailey
INVENTOR
Otto Werner.
BY
F. W. Lyle
ATTORNEY Patented Sept. 29, 1936

2,055,991

UNITED STATES PATENT OFFICE 2,055,991

VOLTAGE CONTROL OF DRY RECTIFIERS

Otto Werner, Berlin-Schoneberg, Germany, assignor to Westinghouse Electric & Manufacturing Company, East Pittsburgh, Pa., a corporation of Pennsylvania Application September 12, 1934, Serial No. 743,746
In Germany October 14, 1933

5 Claims. (Cl. 175—363)

My invention relates to voltage control of rectifiers, and especially to the voltage control of a bridge of dry rectifiers.

An object of my invention is to provide automatically a constant voltage in the direct current output of a rectifier system for the entire load range.

Other objects of my invention will become apparent upon reading the following specification in connection with the drawing in which:

Figure 1 is a diagram of a system embodying my invention.

Fig. 2 is a vector diagram of the voltages in Fig. 1; and

Fig. 3 is a curve illustrating the increase of alternating current voltage applied to the rectifier with an increase in the load current thereon and also illustrating the protection of the rectifier against excessive overloads.

It is well known that dry rectifiers such as the copper oxide and other contact type have relatively large internal resistance and that there is a voltage drop of from 15% to 30% at full load according to the size of the rectifier. The present invention relates to a method of connecting such rectifiers in a system in which the voltage drop is equalized in an especially simple and convenient manner so that a constant voltage is obtained in the direct current output of the unit for the entire load range. The rectifier is also protected against excessive overloads.

In Fig. 1 is illustrated diagrammatically a preferred embodiment of the invention to a rectifier system. The alternating current source 10 provides the alternating current input consisting of the conductors 11 and 12. Inserted in the alternating current input is a series reactor 13 and the input circuit is connected to a bridge 14 consisting of the usual dry type rectifier 15, more particularly referred to as the copper oxide rectifier, in the well known arrangement to provide direct current for the output circuit consisting of the conductors 16 and 17 for the load circuit 18. The condenser 19 is connected through the secondary winding 20 of a transformer 21 connected to the alternating current voltage of the rectifier. The primary winding 22 of this transformer is connected in the alternating current lead 11 to the rectifier. The inductance of the secondary winding 20 of the transformer 21 is made such that a negligibly small current will traverse the condenser at no-load on the rectifier so that the current in the condenser will be substantially proportional to the load current on the rectifier.

In the vector diagram of Fig. 2 the alternating current voltage which is assumed to be constant is indicated by $P_1$, $P_2$ and $P_2'$ indicate the alternating current voltage at the terminals of the rectifier, which voltage is varied in accordance with the invention dependent on the load. $p$ and $p'$ are the additional voltage values provided by the system.

If the current transformer 21 is so dimensioned that the current traversing the condenser 19 at no-load on the rectifier is negligibly small, then the condenser current is directly proportional to the load current traversing the rectifier and the phase angle phi between the load current and the alternating current voltage at the terminals may be assumed to be constant over the full-load range. The diagram of Fig. 2 has been drawn on this assumption. If the load current varies, the additional or auxiliary voltage $p$ provided by the reactor 13 will also vary, and if the alternating current voltage of the supply circuit remains constant, the voltage applied to the rectifier will vary.

Fig. 3 shows the values of the voltage $p_2$ as dependent on the load current J of the rectifier. It will be seen that the voltage applied to the rectifier will increase at first with increasing load, in order to maintain a constant voltage on the direct current side. This increase will take place up to a certain point 23 which marks the beginning of an excessive load upon the rectifier. After passing this point, the voltage applied to the rectifier will decrease at first gradually and then very rapidly to zero. One great advantage of this system embodying the invention is thus shown to be that the rectifier is automatically protected against excessive overloads.

The condenser and the inductance in the alternating current input may be so designed that, with a constant applied alternating current voltage on the rectifier, a direct current voltage which is independent of the load will be obtained. It is not necessary that the entire voltage drop be compensated for as it is possible to obtain different voltage curves for varying loads at any substantially straight line characteristic within any desired load range. In the case of automatic continuous charging of storage batteries, a voltage drop of about 10% from no-load to full-load is only obtained, outside of the system embodying the invention, by making the rectifier very large.

While the system disclosed in Fig. 1 is illustrated for a single phase rectifier, the system can be, of course, used with polyphase rectifiers also especially for the common three-phase system.

The current transformers connected ahead of the condenser should, of course, be made in the form of polyphase transformers.

Although the invention is particularly adaptable and valuable in its application to dry or contact rectifiers where there is a relatively large voltage drop, it can also be used to compensate for the voltage drop of other types of rectifiers such as gas or vapor filled rectifiers.

While I have disclosed my invention as applied to one particular embodiment, it is obvious that the invention can be applied to many other types of embodiments and that various changes may be made in the number and arrangement of the elements disclosed. Accordingly I desire that the terms of the following claims be given the broadest interpretation permissible in view of the prior art.

I claim as my invention:

1. A system for compensating the voltage drop in rectifiers comprising an alternating current input, a direct current output, a rectifier connected between the input and output, a condenser in shunt with the lines supplying said rectifier, an inductance connected in the alternating current input ahead of said condenser, and means whereby the condenser current is automatically variable with the load in the output circuit.

2. A rectifier system comprising an alternating current input, a direct current output, a rectifier connected between said input and output, a condenser in shunt with the lines supplying said rectifier and means whereby the condenser current is automatically variable with the load in the output circuit.

3. A rectifier system comprising an alternating current input, a direct current output, a rectifier connected between said input and output, a primary winding in said alternating current input, and a condenser in series with a secondary winding, said condenser and said secondary winding being connected in shunt with said alternating current input.

4. A rectifier system comprising an alternating current supply, a direct current output, a rectifier connected between said input and output, a secondary winding and a condenser in series connected across said supply, a primary winding in the alternating current input to said rectifier, the dimensions of the condenser and said windings being such that the additional voltage dependent on the load compensates for the voltage drop in the rectifier occurring at that load.

5. A rectifier system comprising an alternating-current supply line having inductive reactance, a rectifier, a series transformer having its primary connected to be energized by the alternating current drawn by said rectifier from said supply lines and its secondary connected to supply current drawn through said inductive reactance to a condenser, the polarity of said secondary relative to that of said primary being such as to cause the current drawn by said condenser through said reactance to induce voltages therein which tend to cause an increase of alternating current voltage impressed on said rectifier when the rectifier load increases at low loads.

OTTO WERNER.